United States Patent [19]

Katoh et al.

[11] Patent Number: 5,295,937
[45] Date of Patent: Mar. 22, 1994

[54] GROOVING MACHINE

[75] Inventors: Fumio Katoh; Takeshi Chikamoto, both of Kanagawa, Japan

[73] Assignee: Amada Company, Limited, Kanagawa, Japan

[21] Appl. No.: 955,858

[22] PCT Filed: Apr. 22, 1992

[86] PCT No.: PCT/JP92/00518

§ 371 Date: Dec. 14, 1992

§ 102(e) Date: Dec. 14, 1992

[87] PCT Pub. No.: WO92/19405

PCT Pub. Date: Nov. 12, 1992

[30] Foreign Application Priority Data

Apr. 25, 1991 [JP] Japan .................. 3-095307

[51] Int. Cl.$^5$ .............................................. B23D 43/02
[52] U.S. Cl. ..................................... 483/28; 409/248; 409/249; 409/259; 409/287; 483/29
[58] Field of Search ............... 483/28, 29, 2, 10, 12; 409/248, 249, 259, 287, 346, 304; 83/875

[56] References Cited

U.S. PATENT DOCUMENTS 4,649,780  3/1987  Takeuchi et al. .

FOREIGN PATENT DOCUMENTS

| 2438176 | 2/1976 | Fed. Rep. of Germany . |  |
|---|---|---|---|
| 2005638 | 12/1969 | France . |  |
| 52-103484 | 8/1977 | Japan . |  |
| 5-24812 | 2/1980 | Japan . |  |
| 66813 | 4/1982 | Japan .................. | 409/287 |
| 44214 | 3/1985 | Japan .................. | 483/28 |
| 63-312005 | 12/1988 | Japan . |  |
| 64-45508 | 2/1989 | Japan . |  |
| 1-79514 | 5/1989 | Japan . |  |
| 3-4362 | 1/1991 | Japan . |  |
| 745647 | 7/1980 | U.S.S.R. .................. | 483/29 |
| 2206513 | 1/1989 | United Kingdom . |  |

OTHER PUBLICATIONS

European Patent Office Search Report.

*Primary Examiner*—Daniel W. Howell
*Attorney, Agent, or Firm*—Sandler, Greenblum & Bernstein

[57] ABSTRACT

A grooving machine efficiently and speedily forms different kinds of grooves on the surface of a plate work (W). The grooving machine comprises a work table (11) on which the work (W) is fixed, a frame (7), an X-axis slider (17) disposed above the work table (11) and horizontally movably supported by the frame (7), a Z-axis slider (19) vertically movably supported by the X-axis slider (17), a tool holder base (75) supported by the Z-axis slider (19), and different kinds of cutting tools (97A to 97C) attached to the tool holder base (75), for grooving the surface of the work (W). Any one of these cutting tools (97A to 97C) is indexed to a cutting position where the work (W) is grooved. The tool holder base (75) has a cutting liquid supply portion (109) for supplying cutting liquid to a cutting zone where the indexed cutting tool cuts the work (W), and a cutting liquid suction portion (111) for sucking and removing excessive cutting liquid.

8 Claims, 8 Drawing Sheets

GROOVING MACHINE

DESCRIPTION

1. Technical Field

The present invention relates to a grooving machine for forming a groove having a required sectional shape on the surface of a plate work, and particularly, to a grooving machine for forming grooves having different sectional shapes or beveled edges on a work.

2. Background Art

Prior arts disclosing a grooving machine are, for example, U.K. Patent Publication No. 2206513, U.S. Pat. No. 4,649,780, French Patent Publication No. 2005638, and Japanese Patent Publication No. 3-4362.

These conventional grooving machines usually employ a frame, an X-axis slider supported by the frame and horizontally movable along an axis X, a Z-axis slider disposed on the X-axis slider and vertically movable, and a cutting tool fitted to a lower part of the Z-axis slider. The cutting tool forms, for example, a V-shaped groove on the surface of a work. If it is required to form a U-shaped groove on the work, the cutting tool on the Z-axis slider must be replaced with another one. This replacement of the cutting tool obstructs improvement of cutting efficiency. When the X-axis slider is moved from the right to the left (or from the left to the right) to groove the surface of the work, cutting liquid is supplied to a cutting zone. When the X-axis slider is returned to the original position, the cutting tool is lifted from the surface of the work. At this time, excessive cutting liquid may drop from the cutting tool onto the surface of the work, to cause a problem that the dropped liquid must be cleaned later.

DISCLOSURE OF INVENTION

To solve this problem, the present invention provides a grooving machine for forming a groove on the surface of a work, comprising a work table on which the work is fixed, a frame, an X-axis slider disposed above the work table and horizontally movably supported by the frame, a Z-axis slider vertically movably supported by the X-axis slider, a tool holder base supported by the Z-axis slider, and a plurality of cutting tools fitted to the tool holder base, for forming different grooves on the surface of the work, the cutting tools being indexed to a cutting position to cut the work.

The tool holder base of the grooving machine according to the present invention preferably has a cutting liquid supply portion for supplying cutting liquid to a cutting zone where one of the cutting tools cuts the work, and a cutting liquid suction portion for sucking excessive cutting liquid.

With the above arrangement, the Z-axis slider is lowered so that one of the cutting tools cuts into the surface of the work, and then the X-axis slider is moved from the right to the left, for example, so that the cutting tool grooves the surface of the work. Before starting these operations, a required one of the cutting tools, which provides a groove of required shape such as a V-shaped groove and a U-shaped groove, is indexed to the cutting position.

While the surface of the work is being grooved, the cutting liquid supply portion of the tool holder base supplies cutting liquid to the cutting zone, to prevent the heating of the cutting tool. When the X-axis slider is returned to the original position, the cutting liquid suction portion of the tool holder base sucks excessive cutting liquid so that the cutting liquid does not drop onto the work during the returning of the X-axis slider to the original position.

BEST MODE OF CARRYING OUT THE INVENTION

The general arrangement of a grooving machine according to the present invention is similar to that disclosed in the U.K. Patent Publication No. 2206513, so that the general arrangement of the present invention will be roughly explained and only parts characteristic to the present invention will be explained in detail.

Figure 1:
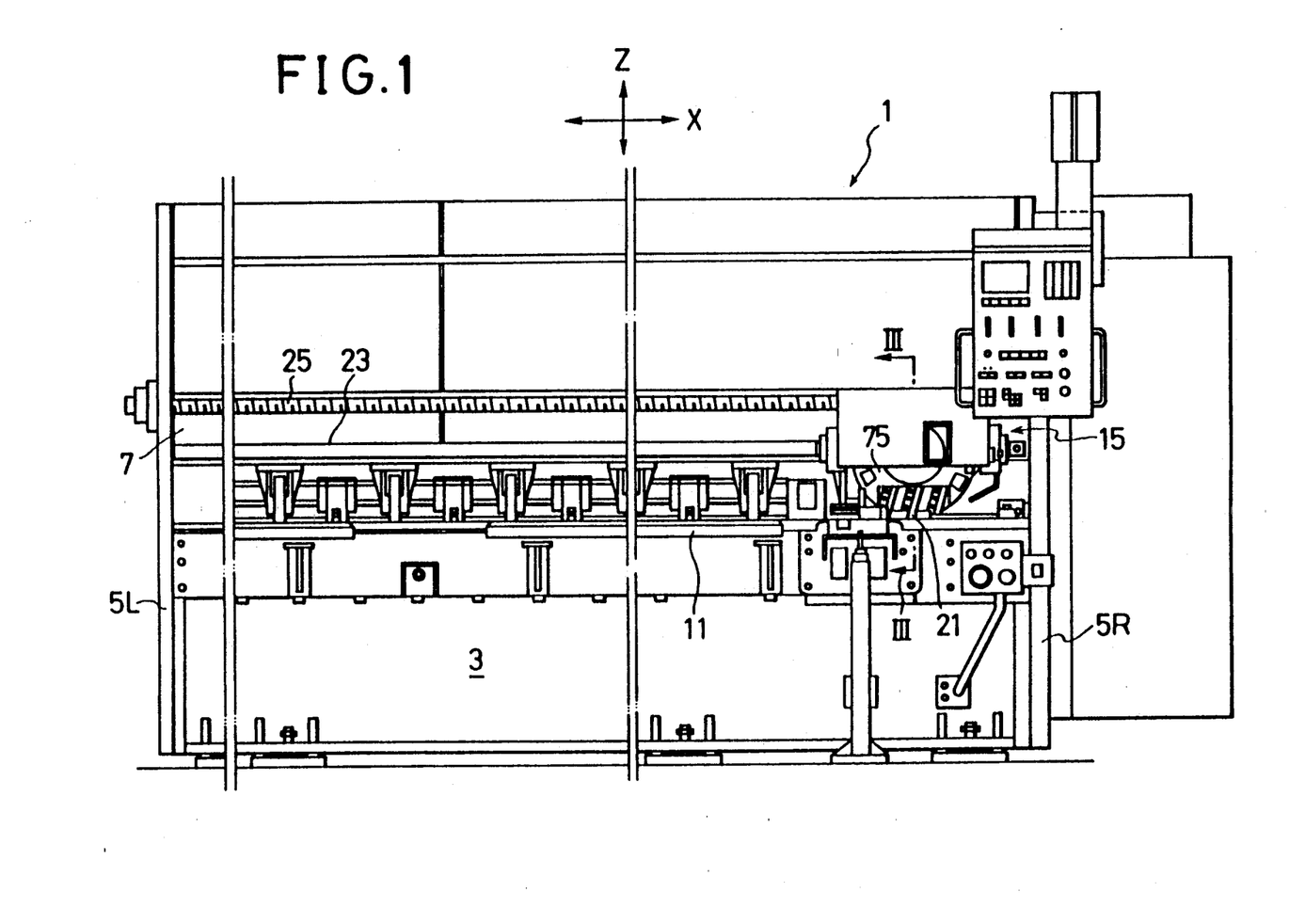
FIG. 1 is a partly omitted front view showing a grooving machine according to a first embodiment of the present invention.
Figure 2:
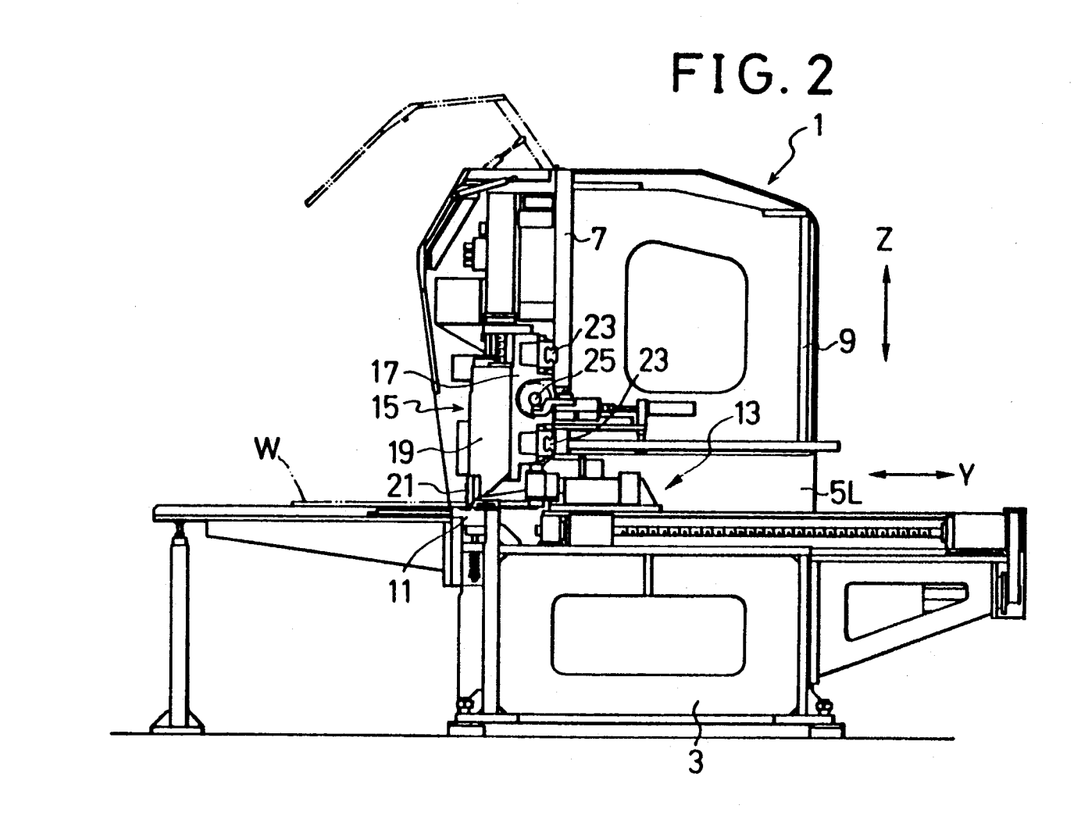
FIG. 2 is a sectional side view showing the grooving machine of FIG. 1.

In FIGS. 1 and 2, the grooving machine 1 according to the first embodiment of the present invention has a long box-like lower frame 3 extending horizontally along an axis X. Upright side frames 5L and 5R are solidly fixed to left and right ends of the lower frame 3. Upper parts of the side frames 5L and 5R are connected to each other with vertical front and rear plates 7 and 9.

The lower frame 3 has a work table 11 for supporting a plate work W. The lower frame 3 has a positioning unit 13 for holding a rear end of the work W and horizontally positioning the work W along an axis Y. The positioning unit 13 employs a known construction, and therefore, the details and operations thereof will be omitted Once the positioning unit 13 positions the work W along the axis Y, a head unit 15 having cutting tools grooves the work W. The head unit 15 is disposed above the work table 11 and horizontally movable.

The head unit 15 comprises an X-axis slider 17 that is horizontally movable along the axis X, and a Z-axis slider 19 that is supported by the X-axis slider 17 and vertically movable along an axis Z. The Z-axis slider 19 holds a cutting tool 21 for grooving the surface of the work W.

Guide rails 23 are fitted to the front plate 7 and extend along the axis X, to guide the head unit 15. A ball screw 25 runs along the axis X to move the head unit 15. Each end of the ball screw 25 is supported by the side frames 5L and 5R.

Figure 3:
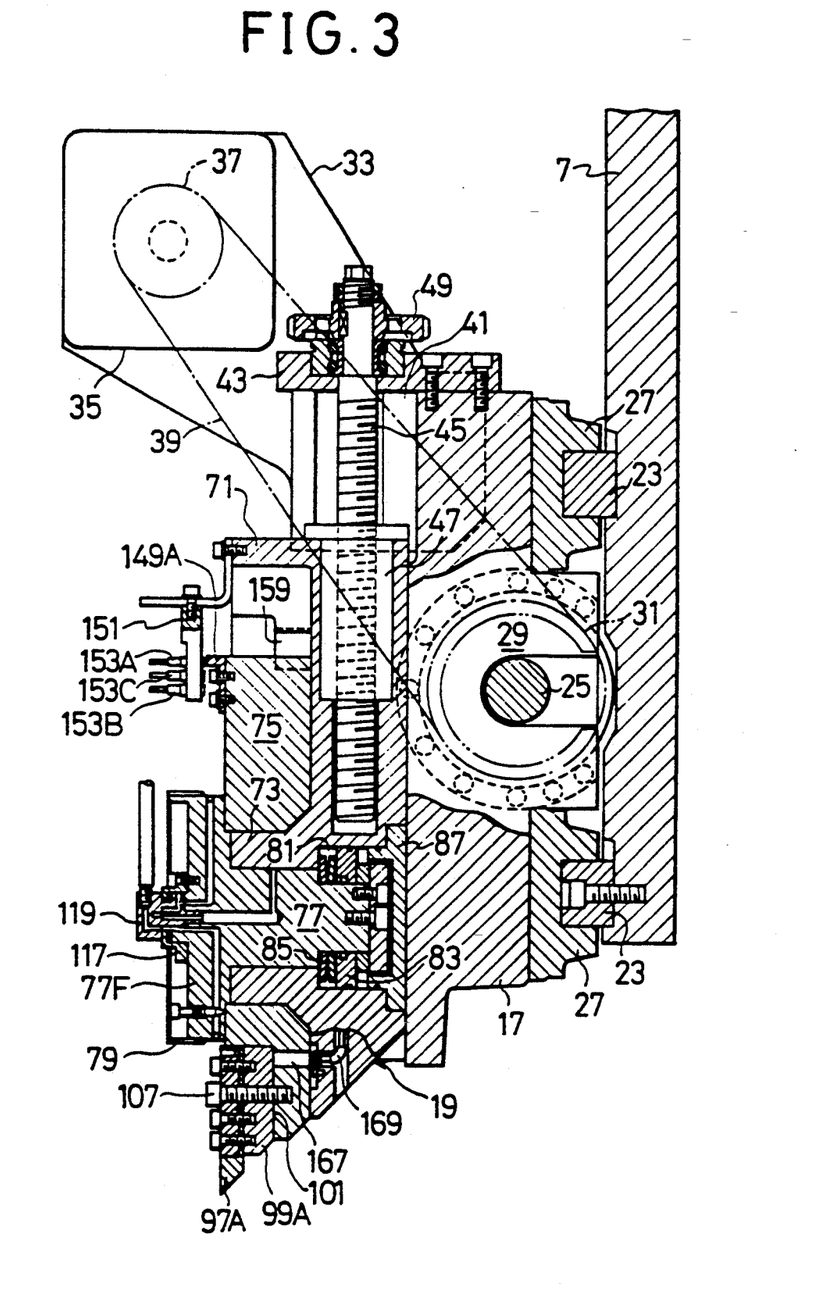
FIG. 3 is an enlarged section taken along a line III—III of FIG. 1.

In FIG. 3, the X-axis slider 17 is supported by a slide block 27, which slides on the guide rails 23. A ball nut 29 of the X-axis slider 17 rotatably engages with the ball screw 25. The ball nut 29 rotates around and moves along the ball screw 25, to move the X-axis slider 17 along the guide rails 23. A sprocket 31 is fixed to the ball nut 29, and a belt 39 is stretched around the sprocket 31 and an output pulley 37 of an X-axis motor 35. This motor 35 is supported by the X-axis slider 17 through a bracket 33.

The X-axis motor 35 turns the ball nut 29 to horizontally move the X-axis slider 17.

Figure 4:
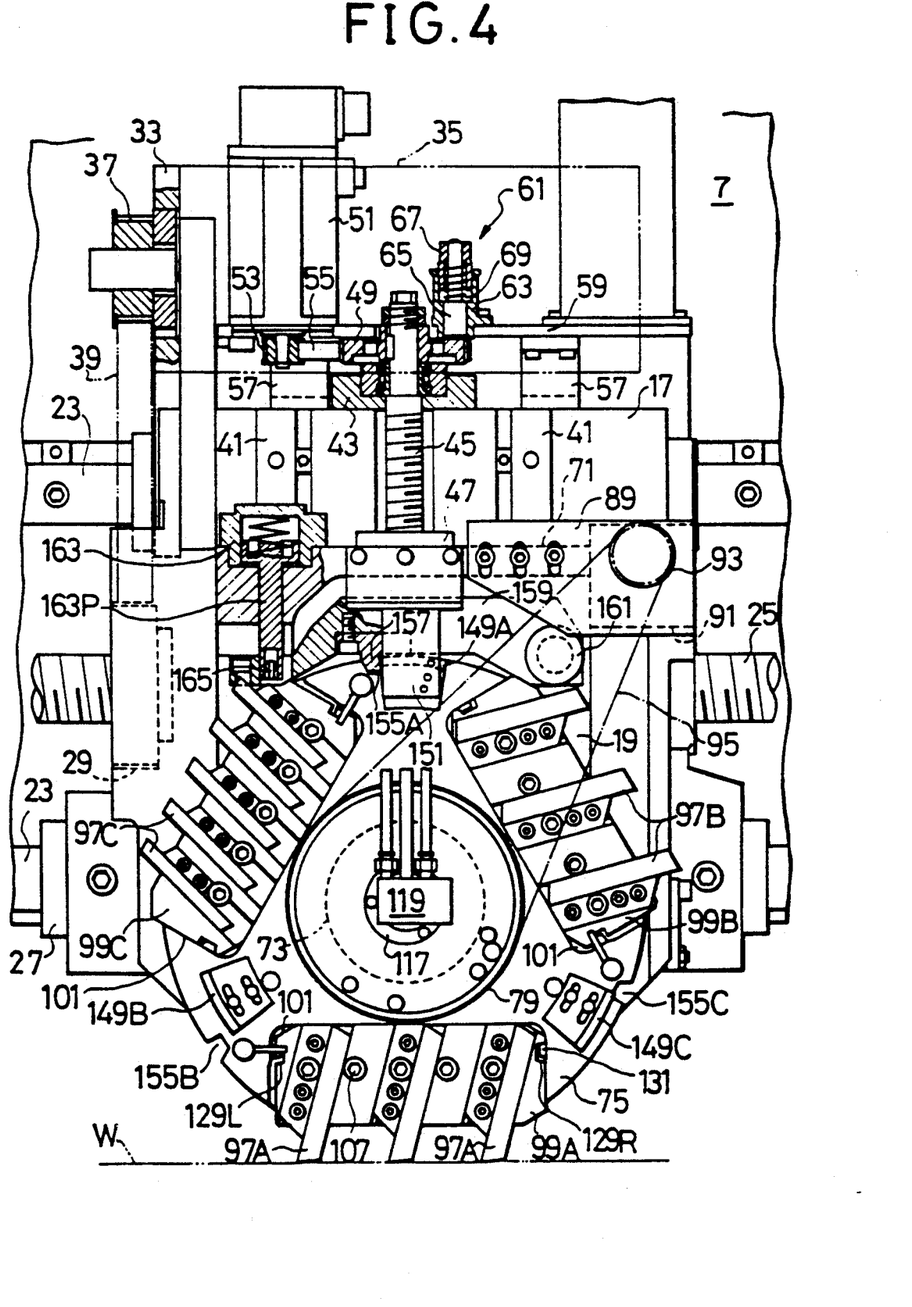
FIG. 4 is a view seen from the left side of FIG. 3, showing an essential part of the grooving machine.

In FIGS. 3 and 4, a plurality of vertically extending guide members 41 are attached to the front face of the X-axis slider 17. The Z-axis slider 19 is vertically guided along these guide members 41.

A bearing block 43 is fitted to an upper part of the X-axis slider 17. The bearing block 43 supports a vertical ball screw 45, which is rotatable in the bearing block 43. A ball nut 47 fixed to the Z-axis slider 19 vertically movably engages with the ball screw 45, to vertically move the Z-axis slider 19.

A pulley 49 is fitted to the top of the ball screw 45. A belt 55 is stretched around the pulley 49 and an output pulley 53 of a Z-axis motor 51 for rotating the ball screw 45. The Z-axis motor 51 is fitted to a base plate 59, which is fixed to an upper part of the X-axis slider 17 by brackets 57.

A braking unit 61 for braking the ball screw 45 is attached to the base plate 59. The braking unit 61 includes an upright guide cylinder 63 disposed on the base plate 59, and a brake pin 65 disposed inside the guide cylinder 63. The bottom of the brake pin 65 is in contact with the top of the pulley 49 so as to slide thereon. An adjustable nut 67 is fastened to the top of the guide cylinder 63, and a spring 69 is disposed between the nut 67 and a stepped portion of the brake pin 65. The spring 69 pushes the brake pin 65 downward.

When the Z-axis motor 51 is suitably driven to turn the ball screw 45 through the pulley 53, belt 55, and pulley 49, the Z-axis slider 19 vertically moves on the X-axis slider 17.

When the ball screw 45 turns, the bottom of the brake pin 65 of the brake unit 61 slides on the top of the pulley 49 fitted to the ball screw 45, to brake the ball screw 45. Accordingly, after completion of rotation, the ball screw 45 is braked so as not to easily turn due to vibration and the like. A braking force applied by the brake pin 65 is easily adjusted by changing the force of the spring 69 by the adjustment of the position of the nut 67.

The Z-axis slider 19 has a box-like shape. A projection 71 protrudes from an upper part of the Z-axis slider 19 toward the front side (the left side in FIG. 3), and a cylindrical bearing 73 protrudes from a lower part of the Z-axis slider 19 toward the front side, as shown in FIG. 3.

An annular tool holder base 75 is rotatably disposed around the cylindrical bearing 73, and a rotary shaft 77 is disposed in the cylindrical bearing 73.

The outer end (the left end in FIG. 3) of the rotary shaft 77 has a flange 77F of a large diameter. A gear 79 is formed along the periphery of the flange 77F. The flange 77F is integrally connected to the tool holder base 75 with bolts (not shown), so that the tool holder base 75 and rotary shaft 77 turn together.

The inner end (the right end in FIG. 3) of the rotary shaft 77 has a piston 83, which slides in a cylinder chamber 81 formed in the Z-axis slider 19. A disk spring 85 is disposed between the piston 83 and the bottom of the cylinder chamber 81. A cap 87 closes the cylinder chamber 81.

With this arrangement, the disk spring 85 pushes the rotary shaft 77 rightward in FIG. 3, to press the flange 77F of the rotary shaft 77 against an end face of the cylindrical bearing 73. When fluid is supplied into the cylinder chamber 81 between the piston 83 and the cap 87, the rotary shaft 77 is moved leftward in FIG. 3 against the disk spring 85, to separate the flange 77F of the rotary shaft 77 away from the end face of the bearing 73. As a result, the rotary shaft 77 becomes easily rotatable.

The joined rotary shaft 77 and tool holder base 75 are turned together. For this purpose, a bracket 89 is fitted to an end of the projection 71 of the Z-axis slider 19 with bolts, and an indexing motor 91 is attached to the bracket 89, as shown in FIG. 4. A timing belt 95 is stretched around the gear 79 and an output gear 93 provided on an output shaft of the motor 91.

The motor 91 is suitably driven to turn the rotary shaft 77 and tool holder base 75 together.

Cutting tools 97A, 97B, and 97C are fitted to tool cassettes 99A, 99B, and 99C, respectively. These tool cassettes are removably fitted to respective peripheral locations on the front face of the annular tool holder base 75.

Namely, cassette receiving recesses 101 for removably receiving the tool cassettes 99A, 99B, and 99C, respectively, are formed on the front face of the tool holder base 75 along the periphery thereof.

Since the tool cassettes 99A, 99B, and 99C are identical to one another, the tool cassette 99A will be explained in detail.

Figure 5:
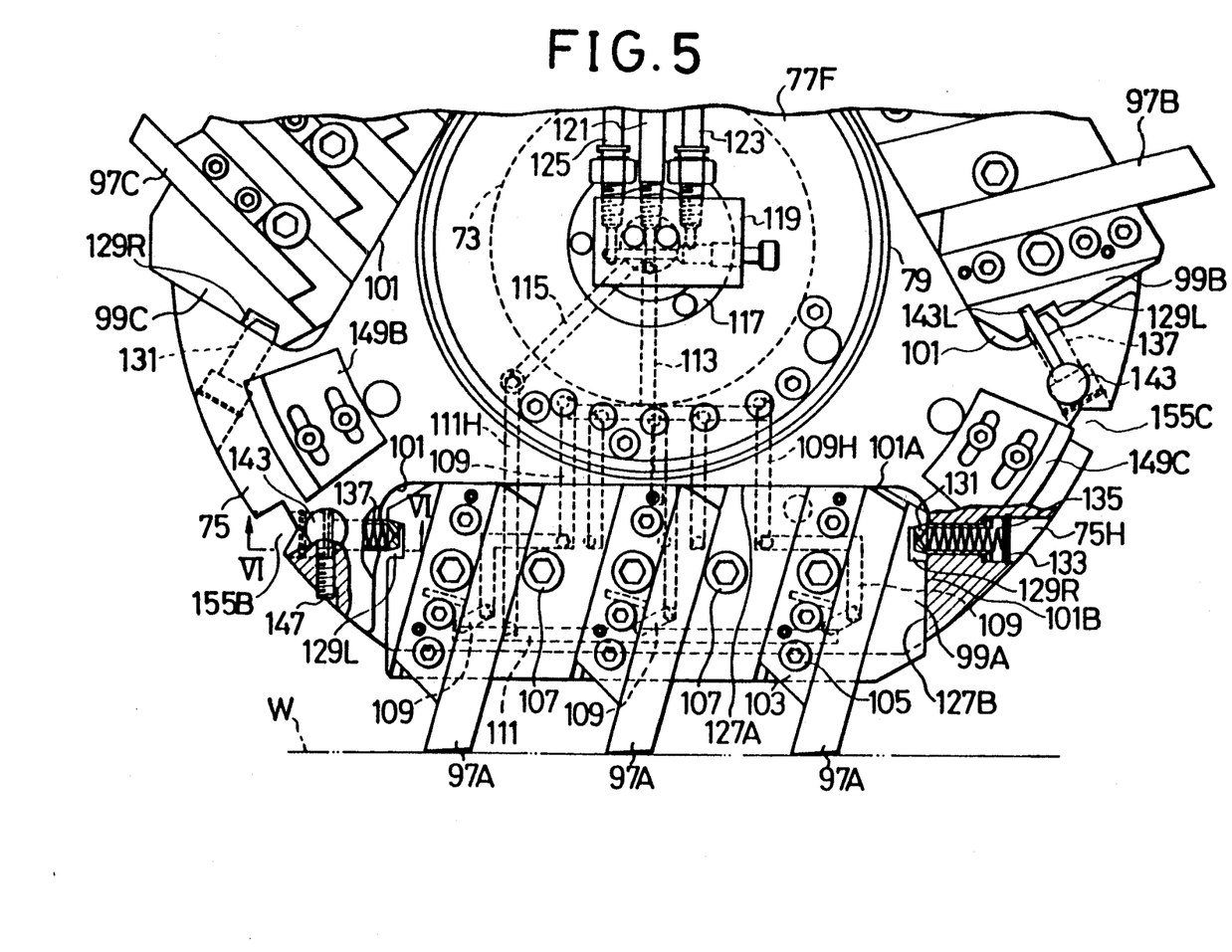
FIG. 5 is an enlarged front view showing a part of FIG. 4.

As shown in FIG. 5, the mounting of the cutting tools 97A on the tool cassette 99A is effected by a fitting block 103 which is fixed to the tool cassette 99A with bolts 105.

The fitting block 103 has a wedge-like shape. The structure for fixing the cutting tools 97A to tool cassette 99A is essentially the same as that disclosed in the U.K. Patent Publication No. 2206513, so that the details thereof will be omitted.

The tool cassette 99A is fixed to the cassette receiving recess 101 with bolts 107. The tool cassette 99A has cutting liquid supply holes 109 for supplying cutting liquid to the cutting tools 97A, and an air hole 111 communicating with outlets of the cutting liquid supply holes 109.

The cutting liquid supply holes 109 and air hole 111 communicate with cutting liquid supply holes 109H and an air hole 111H respectively, both of which are formed on the tool holder base 75 in such a manner to communicate with the cassette receiving recess 101. The cutting liquid supply holes 109H and air hole 111H communicate with a supply hole 113 and an air hole 115 respectively which are formed on the flange 77F of the rotary shaft 77.

The supply hole 113 and air hole 115 are connected to a rotary joint 119, which is mounted on an end face of the rotary shaft 77 through an annular fitting 117 in such a manner to rotate relative to the rotary shaft 77. The rotary joint 119 is connected to a supply pipe 121 for supplying cutting liquid, an air blow pipe 123, and a suction pipe 125.

The air blow pipe 123 and suction pipe 125 are both connected to the air hole 115, and are alternately connected to discharge or suction ports of an air pump (not shown) by operations of a switching valve (not shown) such as a solenoid valve.

The cutting liquid is supplied to the cutting tools 97A through the supply pipe 121, rotary joint 119, supply hole 113, and cutting liquid supply holes 109H and 109. The cutting liquid is then supplied to a cutting zone.

While the cutting liquid is being supplied to the cutting zone, the suction pipe 125 is closed, and the air blow pipe 123 supplies air through the air holes 115, 111H, and 111 toward outlets of the cutting liquid supply holes 109, to atomize the cutting liquid at the outlets. When the cutting process ends, the air blow pipe 123 is closed, and the suction pipe 125 sucks air through the air holes 115, 111H, and 111, to draw and remove excessive cutting liquid from the outlets of the cutting liquid supply holes 109. This arrangement prevents the excessive cutting liquid from dropping onto the work W after the supply of the cutting liquid is stopped.

The tool cassette 99A must be accurately positioned in the cassette receiving recess 101. For this purpose, the cassette receiving recess 101 has reference faces 101A and 101B that are perpendicular to each other, and the tool cassette 99A has reference faces 127A and 127B that are perpendicular to each other.

The reference faces 127A and 127B of the tool cassette 99A are caused to be in contact with the reference faces 101A and 101B of the cassette receiving recess 101 respectively, to accurately position the tool cassette 99A in the cassette receiving recess 101.

The tool cassette 99A is easily attached to and detached from the cassette receiving recess 101 by means of stop grooves 129L and 129R formed on the left and right side faces of the tool cassette 99A. The right stop groove 129R receives a tapered tip of a stop pin 131 protruding from the reference face 101B toward the inside of the cassette receiving recess 101. The stop pin 131 slides in a hole 75H formed in the tool holder base 75. A spring 135 is disposed between a spring seat 133 fixed in the hole 75H and the stop pin 131, to push the stop pin 131 toward the inside of the cassette receiving recess 101.

The left stop groove 129L of the tool cassette 99A engages with a pushing and fixing member 137, which pushes the reference faces 127A and 127B of the tool cassette 99A against the reference faces 101A and 101B of the cassette receiving recess 101.

Figure 6:
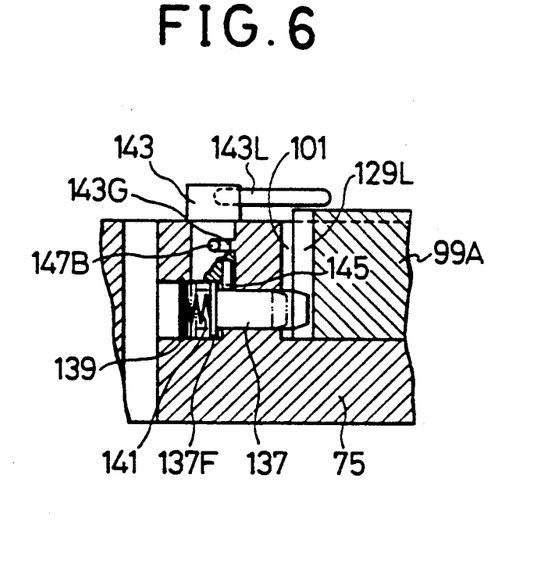
FIG. 6 is an enlarged section taken along a line VI—VI of FIG. 5.

As shown in FIG. 6, the pushing and fixing member 137 resembles to the stop pin 131. A spring 141 is disposed between a spring seat 139 and the pushing and fixing member 137, to push the pushing and fixing member 137 toward the inside of the cassette receiving recess 101.

The tool cassette 99A is released from the pushing and fixing member 137 by means of a shaft 143. The shaft 143 has a lever 143L and is rotatably fitted to the tool holder base 75. A pushing pin 145 is fitted to an end face of the shaft 143 at an eccentric position. The pushing pin 145 pushes, against the spring 141, a flange 137F formed at an end of the pushing and fixing member 137. The shaft 143 has a peripheral groove 143G, which engages with a ball 147B of a ball plunger 147 (FIG. 5) to prevent the shaft 143 from dropping out.

With this arrangement, the tool cassette 99A is fitted to the cassette receiving recess 101, and the stop pin 131 is inserted into the right stop groove 129R of the tool cassette 99A. The pushing and fixing member 137 is then engaged with the left stop groove 129L. The spring 141 pushes and positions the reference faces 127A and 127B of the tool cassette 99A against the reference faces 101A and 101B of the cassette receiving recess 101.

Once the tool cassette 99A is positioned, the bolts 107 are fastened to accurately fix the tool cassette 99A to the cassette receiving recess 101.

To remove the tool cassette 99A from the cassette receiving recess 101, the bolts 107 are unfastened, and the lever 143L of the shaft 143 is turned to remove the pushing and fixing member 137 out of the left stop groove 129L of the tool cassette 99A.

In this way, the tool cassette 99A is accurately fitted to and easily removed from the cassette receiving recess 101 of the tool holder base 75.

The tool cassettes 99A, 99B, and 99C fixed at respective locations on the tool holder base 75 are indexed to a lower cutting position to cut the work W, by rotating the rotary shaft 77 by the motor 91.

To index the tool cassettes 99A, 99B, and 99C to the lower cutting position, dogs 149A to 149C corresponding to the cassette receiving recesses 101 are disposed on the tool holder base 75. Sensors 153A to 153C for detecting the dogs 149A to 149C are disposed on a bracket 151 (FIG. 3) attached to the projection 71 of the Z-axis slider 19.

The dogs 149A to 149C are detected by the sensors 153A to 153C, to index a required one of the tool cassettes 99A to 99C to the lower cutting position. After the indexing, the tool holder base 75 is fixed. For this purpose, stop recesses 155A to 155C (FIG. 4) corresponding to the cassette receiving recesses 101 are formed on the periphery of the tool holder base 75.

The Z-axis slider 19 has a lock lever 159. The lock lever 159 pivots on a shaft 161 and has a claw 157, which removably engages with any one of the stop recesses 155A to 155C. A fluid pressure cylinder 163 for driving the lock lever 159 is attached to the other end of the projection 71 of the Z-axis slider 19. A vertically movable piston rod 163P is disposed inside the fluid pressure cylinder 163. The free end of the piston rod 163P is connected to the free end of the lock lever 159 with a connection pin 165.

When the piston rod 163P is moved upward in the fluid pressure cylinder 163, the lock lever 159 is moved upward in FIG. 4, so that the claw 157 of the lock lever 159 is removed from one of the stop recesses 155A to 155C. Under this state, the tool holder base 75 is rotatable.

The tool holder base 75 is suitably turned, and a required one of the tool cassettes 99A to 99C is indexed to the lower cutting position. Then, the lock lever 159 is lowered so that the claw 157 of the lock lever 159 engages with one of the stop recesses 155A to 155C, to fix the tool holder base 75.

With this arrangement, any one of the tool cassettes 99A to 99C attached to the tool holder base 75 can be indexed to the cutting position, and a corresponding one of the cutting tools 97A to 97C attached to the tool cassettes 99A to 99C effects processing, for example, a V-shape grooving, a U-shape grooving, or a beveled face processing.

When one of the tool cassettes 99A to 99C is indexed to the lower cutting position, it may be necessary to detect whether the tool cassette is provided in the cassette receiving recess 101 indexed to the cutting position. For this purpose, a through hole 167 (FIG. 3) is formed at the bottom of each of the cassette receiving recesses 101. A sensor 169 aligning with the through hole 167 is fitted to a lower part of the Z-axis slider 19.

The sensor 169 emits a light beam toward the through hole 167 and detects a reflected beam from the back face of one of the tool cassettes 99A to 99C of the indexed cassette receiving recess 101, to detect the presence of the tool cassette 99A to 99C.

The sensor 169 detects not only whether the tool cassettes 99A to 99C are in the cassette receiving recesses 101, but also whether the tool cassettes 99A to 99C are attached to or detached from the cassette receiving recesses 101. Accordingly, the sensor 169 detects mounting/dismounting of the tool cassettes 99A to 99C in the corresponding cassette receiving recess 101. Thus, when the mounting/dismounting is detected, it is in turn detected that it is necessary to correct the home position of the cutting tool in the Z-axis direction to detect a lower end of the cutting tool of the newly attached tool cassette.

As described above, in this embodiment, the plurality of the tool cassettes 99A to 99C are provided in the tool holder base 75, and any one of the tool cassettes 99A to 99C to the cutting position can be indexed to the cutting position, and a processing on the work W with the cutting tool of the indexed tool cassette can be effected. Accordingly, grooves and beveled faces having different shapes are quickly formed on the work W by changing the cutting tools 97A to 97C from one to another.

Furthermore, when grooving the work W, cutting liquid is supplied to the cutting zone, and after the grooving, excessive cutting liquid is sucked and removed, thereby the excessive cutting liquid being prevented from dropping on the work W.

Figure 7:
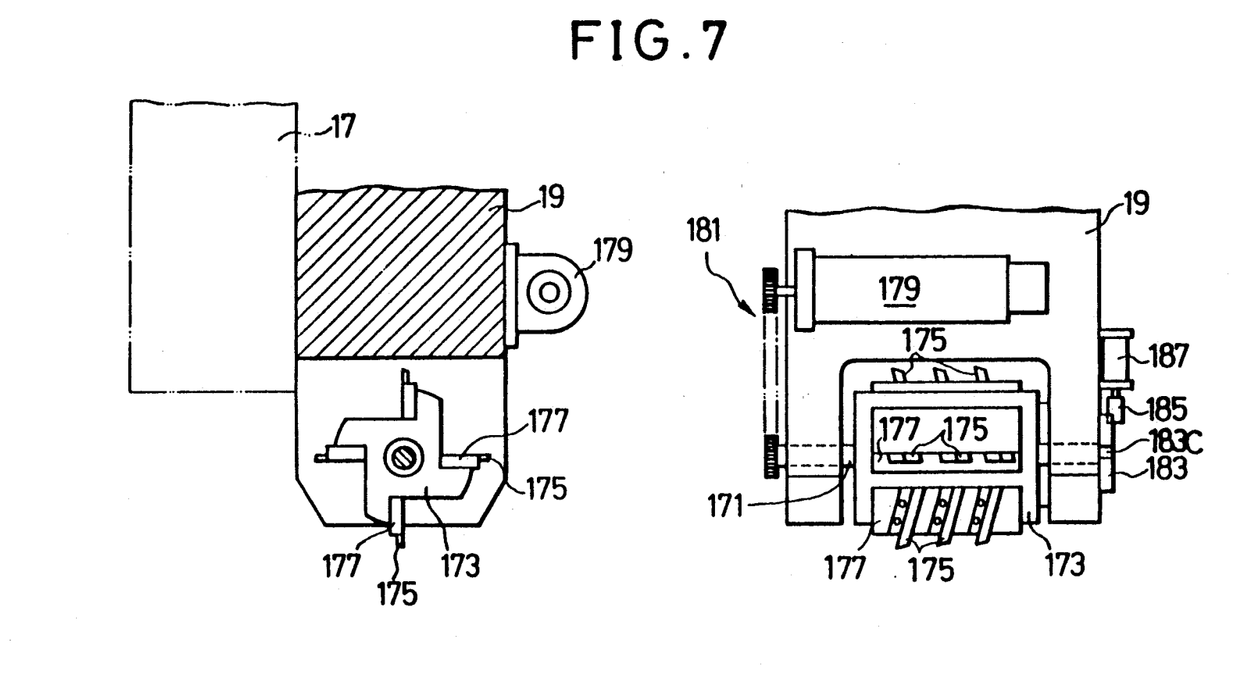
FIG. 7 is an explanatory view showing an essential part of a second embodiment of the present invention.

FIG. 7 shows the second embodiment of the present invention. According to this embodiment, a Z-axis slider 19 has a lower recess for accommodating a rotary shaft 171 extending along an axis X. A tool holder base 173 is fitted to the rotary axis 171. A plurality of tool cassettes 177 are disposed on the periphery of the tool holder base 173. Each of the tool cassettes 177 has a plurality of cutting tools 175.

A motor 179 is disposed on the Z-axis slider 19, and a torque transmission mechanism 181 such as a belt connects the motor 179 with the rotary shaft 171, to turn the rotary shaft 171. The rotary shaft 171 is turned, indexed, and then fixed. For this purpose, an indexing disk 183 is fitted to the other end of the rotary shaft 171. The periphery of the indexing disk 183 has a plurality of indexing recesses 183C. A cylinder 187 is disposed on the Z-axis slider 19. The cylinder 187 has a stopper 185 which removably engages with one of the indexing recesses 183C.

In the second embodiment, the motor 179 is derived to index one of the tool cassettes 177 to a lower cutting position, providing the same effect as the first embodiment.

Figure 8:
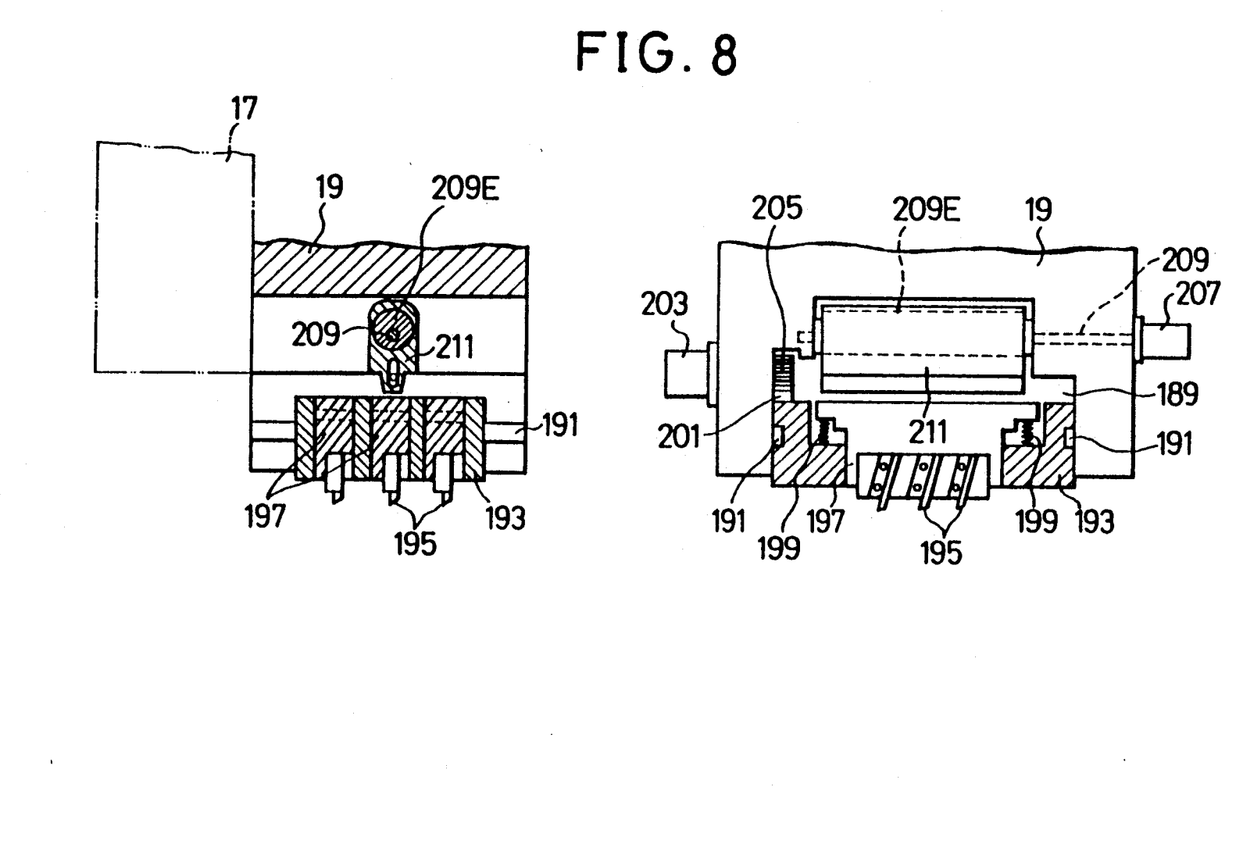
FIG. 8 is an explanatory view showing an essential part of a third embodiment of the present invention.

FIG. 8 shows the third embodiment of the present invention. In this embodiment, a Z-axis slider 19 has a lower recess 189 extending along an axis Y. Guide rails 191 extending along the axis Y are disposed in the recess 189. A box-like tool holder base 193 slides on the guide rails 191.

A plurality of tool cassettes 197 are vertically movably supported on the tool holder base 193 with springs 199 therebetween. Each of the tool cassettes 197 supports a plurality of cutting tools 195. The tool holder base 193 is movable along the axis Y by means of a rack 201 extending along the axis Y and a pinion 205 engaging with the rack 201. The pinion 205 is rotated by a motor 203.

Accordingly, when the motor 203 is suitably driven, the tool holder base 193 is moved on the guide rails 191.

A rotary shaft 209 is disposed in the Z-axis slider 19 at a middle thereof in the Y-axis direction and is rotated by a motor 207. An eccentric portion 209E of the rotary shaft 209 engages with an upper part of a vertically movable ram 211. A known technique is employed to vertically movably support the ram 211 while restricting its movements along the axis X. The eccentric portion 209E of the rotary shaft 209 is rotatable in the ram 211.

Accordingly, when the motor 207 is driven, the rotary shaft 209 rotates to vertically move the ram 211 (the ram 211 is at its upper position in FIG. 7). When the ram 211 is lowered, one of the tool cassettes 197, which has been indexed and positioned just under the ram 211 by the motor 203, is pushed down against the springs 199. As a result, the cutting tools 195 attached to this tool cassette 197 groove a work W.

In this way, in the third embodiment, a required one of the tool cassettes 197 is indexed and positioned just under the ram 211, and the work W is processed with the cutting tools 195 of this tool cassette 197, thereby the same effect as the previous embodiments being provided.

INDUSTRIAL APPLICABILITY

As understood from the description of the embodiments, with the present invention, it is possible to quickly effect processing of a work by using a plurality of cutting tools. Thus, the present invention improves working efficiency and is industrially applicable The present invention supplies cutting liquid to a cutting zone where the cutting tools process the work, and sucks and removes excessive cutting liquid from the cutting zone, to prevent the excessive cutting liquid from dropping onto the work.

We claim:

1. A grooving machine for grooving the surface of a work, comprising: a work table on which the work is fixed; a frame; an X-axis slider disposed above said work table and horizontally movably supported by said frame; a Z-axis slider vertically movably supported by said X-axis slider; a tool holder base supported by said Z-axis slider; and a plurality of cutting tools attached to said tool holder base, for grooving the surface of the work, any one of said cutting tools being indexed to a cutting position where the work is grooved.

2. The grooving machine according to claim 1, wherein said tool holder base is rotatably supported by said Z-axis slider, and said cutting tools are fitted to said tool holder base at a plurality of peripheral locations, respectively.

3. The grooving machine according to claim 2, wherein said tool holder base has cassette receiving recesses at the peripheral locations, respectively, each of the cassette receiving recesses having at least two perpendicular reference faces, tool cassettes each having two reference faces are removably fixed the respective recesses, the tool cassettes being positioned in the recesses by causing the reference faces to be in contact with the reference faces, and said cutting tools are removably fitted to the tool cassettes, respectively.

4. The grooving machine according to claim 3, wherein each of the cassette receiving recesses of said tool holder base has a pressing and fixing member for pressing the two reference faces of one of the tool cassettes against the two reference faces of the corresponding cassette recess.

5. The grooving machine according to claim 1, wherein said tool holder base has a cutting liquid supply portion for supplying cutting liquid to a cutting zone where one of said cutting tools cuts the work, and a cutting liquid suction portion for sucking excessive cutting liquid.

6. The grooving machine according to claim 3, wherein said Z-axis slider has a sensor for detecting whether any one of the tool cassettes indexed to the cutting zone is attached to or detached from the corresponding cassette receiving recess of said tool holder base.

7. A grooving machine for grooving the surface of a work, comprising: a work table on which the work is fixed; a frame; an X-axis slider disposed above said work table and horizontally movably supported by said frame; a Z-axis slider vertically movably supported by said X-axis slider; a tool holder base supported by said Z-axis slider; cassette receiving recesses formed on said tool holder base; tool cassettes removably attached to said cassette receiving recesses, respectively; cutting tools attached to said tool cassettes, respectively; and a pressing and fixing member disposed in each of said cassette receiving recesses, to press two reference faces of one said tool cassettes against two reference faces of a corresponding one of said cassette receiving recess.

8. A grooving machine for grooving the surface of a work, comprising: a work table on which the work is fixed; a frame; an X-axis slider disposed above said work table and horizontally movably supported by said frame; a Z-axis slider vertically movably supported by said X-axis slider; a tool holder base horizontally movably supported by Z-axis slider; a plurality of tool cassettes vertically movably supported by said tool holder base; and a vertically movable ram disposed on said Z-axis slider, any one of said tool cassettes being indexed to under said ram.

* * * * *

UNITED STATES PATENT AND TRADEMARK OFFICE
CERTIFICATE OF CORRECTION

PATENT NO. : 5,295,937
DATED : March 22, 1994
INVENTOR(S) : Fumio KATOH et al.

It is certified that error appears in the above-indentified patent and that said Letters Patent is hereby corrected as shown below:

On the cover page, in section [56], "References Cited", line 4 under "FOREIGN PATENT DOCUMENTS", change "5-24812" to ---55-24812---.

Signed and Sealed this

Twenty-second Day of August, 1995

Attest:

BRUCE LEHMAN

Attesting Officer

Commissioner of Patents and Trademarks